(12) United States Patent
Schulte et al.

(10) Patent No.: US 7,546,328 B2
(45) Date of Patent: Jun. 9, 2009

(54) DECIMAL FLOATING-POINT ADDER

(75) Inventors: Michael J. Schulte, Madison, WI (US);
John D. Thompson, Franklin, WI (US);
Nandini Karra, Folsom, CA (US)

(73) Assignee: Wisconsin Alumni Research Foundation, Madison, WI (US)

(*) Notice: Subject to any disclaimer, the term of this patent is extended or adjusted under 35 U.S.C. 154(b) by 877 days.

(21) Appl. No.: 10/941,645

(22) Filed: Sep. 15, 2004

(65) Prior Publication Data
US 2006/0047739 A1    Mar. 2, 2006

Related U.S. Application Data

(60) Provisional application No. 60/605,784, filed on Aug. 31, 2004.

(51) Int. Cl.
*G06F 7/42*    (2006.01)

(52) U.S. Cl. .................................. 708/505; 708/680

(58) Field of Classification Search .............. 708/505, 708/680
See application file for complete search history.

(56) References Cited

U.S. PATENT DOCUMENTS

| | | | |
|---|---|---|---|
| 3,991,307 A | 11/1976 | Peddle et al. | |
| 4,118,786 A | 10/1978 | Levine et al. | |
| 4,138,731 A | 2/1979 | Kamimoto et al. | |
| 4,172,288 A | 10/1979 | Anderson | |
| 4,276,596 A * | 6/1981 | Flynn et al. | 712/245 |
| 4,488,252 A | 12/1984 | Vassar | |
| 4,677,583 A | 6/1987 | Ohtsuki et al. | |
| 4,805,131 A | 2/1989 | Adiletta et al. | |
| 4,864,527 A | 9/1989 | Peng et al. | |
| 4,866,656 A | 9/1989 | Hwang | |
| 5,007,010 A | 4/1991 | Flora | |
| 5,027,308 A | 6/1991 | Sit et al. | |
| 5,424,968 A | 6/1995 | Okamoto | |
| 5,732,007 A | 3/1998 | Grushin et al. | |
| 5,745,399 A | 4/1998 | Eaton et al. | |
| 5,808,926 A | 9/1998 | Gorshtein et al. | |
| 5,928,319 A | 7/1999 | Haller et al. | |
| 5,931,896 A | 8/1999 | Kawaguchi | |
| 6,148,316 A | 11/2000 | Herbert et al. | |
| 6,292,819 B1 | 9/2001 | Bultmann et al. | |

(Continued)

OTHER PUBLICATIONS

Cowlishaw, "Decimal Floating-Point : Algorism for Computers", Proceedings of the 16th IEEE Symposium on Compute Arithmetic (ARITH'03) 2003 IEEE.*

(Continued)

*Primary Examiner*—Tan V Mai
(74) *Attorney, Agent, or Firm*—Shumaker & Sieffert, P.A.

(57) ABSTRACT

A decimal floating-point adder is described that performs addition and subtraction on decimal floating-point operands. The decimal floating-point adder includes an alignment unit that receives a first floating-point number and a second floating-point number, and aligns significands associated with the floating-point numbers such that exponents associated with the floating-point numbers have equal values. The decimal-floating-point adder further includes a binary adder that adds the aligned significands. The floating-point adder includes a correction unit and an output conversion unit to produce a final resultant decimal floating-point number. The decimal floating-point adder may be pipelined so that complete resultant decimal floating-point numbers may be output each clock cycle.

44 Claims, 10 Drawing Sheets

U.S. PATENT DOCUMENTS

| | | | |
|---|---|---|---|
| 6,546,411 | B1 | 4/2003 | Singh |
| 7,299,254 | B2 | 11/2007 | Alagarsamy et al. |
| 2001/0051969 | A1 | 12/2001 | Oberman et al. |
| 2002/0129075 | A1 | 9/2002 | Park et al. |
| 2002/0133525 | A1 | 9/2002 | Chen et al. |
| 2003/0055859 | A1 | 3/2003 | Seidel et al. |
| 2003/0101207 | A1 | 5/2003 | Dhong et al. |

OTHER PUBLICATIONS

Logan, "What Is Scientific Notation And How Is It Used?" (c) 1995, Revised Jul. 11, 2001, http://members.aol.com/profchm/sci_not.html.*

Cowlishaw et al., "A Decimal Floating-Point Specification", pp. 147-154, 2003 IEEE.*

Thompson et al, "A 64-bit Decimal Floating-Point Adder", 2004 IEEE.*

Martin S. Schmookler et al., "High Speed Decimal Addition," *IEEE Transactions on Computers*, vol. C-20, No. 8, pp. 862-866, Aug. 1971.

Mark A. Erle et al., "Decimal Multiplication Via Carry-Save Addition," *IEEE 14th International Conference on Application-Specific Systems, Architectures and Processors*, 11 pages, 2003.

Behrooz Shirazi et al., "RBCD: Redundant Binary Coded Decimal Adder," *IEEE Proceedings*, vol. 136, Part E, No. 2, pp. 156-160, Mar. 1989.

Behrooz Shirazi et al., "VLSI Designs for Redundant Binary-Coded Decimal Addition," *Proceedings of the 7th Annual International Conference on Computers and Communications*, pp. 52-56, Mar. 1988.

Robert D. Kenney et al., "Multioperand Decimal Addition," *Proceedings of the IEEE Computer Society Annual Symposium on VLSI*, 10 pages. Feb. 2004.

Draft Standard for Floating-Point Arithmetic P754/D0.10.9, http://754r.ucbtest.org/drafts/754r.pdf, IEEE, 136 pages, Apr. 6, 2005.

U.S. Appl. No. 11/014,674, filed Dec. 16, 2004, entitled "Processing Unit Having Multioperand Decimal Addition,".

Office Action dated May 1, 2008, for U.S. Appl. No. 11/014,674, (14 pages).

Office Action dated Oct. 31, 2008, for U.S. Appl. No. 11/014,674, (15 pages).

* cited by examiner

_US 7,546,328 B2_

DECIMAL FLOATING-POINT ADDER

This application claims the benefit of U.S. Provisional Application Ser. No. 60/605,784, entitled "DECIMAL FLOATING-POINT ADDER," filed Aug. 31, 2004, the entire content of which is incorporated herein by reference.

TECHNICAL FIELD

The invention relates to computing devices and, more particularly, to techniques for performing arithmetic operations within computing devices.

BACKGROUND

Although most people use decimal arithmetic when performing manual calculations, computers typically only support binary arithmetic in hardware. This is primarily due to the fact that modern computers typically only represent two logic values: zero and one. While it is possible to use these two logic values to represent decimal numbers, doing so is wasteful in terms of storage space and often computationally less efficient. For example, in binary, four bits can represent sixteen values; while in binary coded decimal (BCD), four bits only represent ten values. Since most computer systems do not provide hardware support for decimal arithmetic, numbers are typically input in decimal, converted from decimal to binary, processed using binary arithmetic and then converted back to decimal for output.

In spite of the current dominance of hardware support for binary arithmetic, there are several motivations that encourage the provision of support for decimal arithmetic. First, applications that deal with financial and other real-world data often introduce errors since many common decimal numbers cannot be represented exactly in binary. For example, the decimal number "0.1" is a repeating fraction when represented in binary. Second, people typically think about computations in decimal, even when using computers that operate only on binary representations, and therefore may experience what is perceived as incorrect behavior when processing decimal values. Third, converting between binary and decimal floating-point numbers is computationally intensive. For example, conversion on modern processors may take thousands of processing cycles.

In an effort to alleviate some of the problems that occur when a computer only supports binary arithmetic in hardware, several software packages and programming language extensions for decimal arithmetic have been developed. Although some of these packages are successful in eliminating binary-to-decimal and decimal-to-binary conversion errors, the packages are often hundreds to thousands of times slower than binary operations implemented in hardware.

SUMMARY

In general, the invention is directed to techniques for performing decimal floating-point arithmetic and, more particularly, decimal floating-point addition and subtraction. For example, a processing unit is described that includes a decimal floating-point adder for performing addition and subtraction on decimal-floating-point operands.

Embodiment of the decimal floating-point adder may be pipelined so that complete resultant decimal floating-point numbers may be output each clock cycle instead of computing only a single digit of the result every clock cycle. Moreover, a pipelined decimal floating-point adder may achieve a critical path delay slightly greater than comparable fixed-point binary adders. As a result, the decimal adder and the techniques described herein may be especially suited for numerically intensive commercial applications.

In one embodiment, a processor comprises a pipelined decimal-floating-point adder having a plurality of stages. The decimal-floating-point adder performs an arithmetic operation on a first decimal floating-point number and a second decimal floating-point number and outputs a decimal floating-point result each clock cycle.

In another embodiment, a processor comprises a decimal floating-point adder that performs an arithmetic operation on a first decimal floating-point number and a second decimal floating-point number and outputs a decimal floating-point number. The decimal floating-point adder includes an alignment unit having a first input to receive a first significand and a first exponent associated with the first floating-point number, and a second input to receive a second significand and a second exponent associated with the second floating-point number. The alignment unit aligns the first significand and the second significand so that the first exponent and the second exponent have an equal value.

In another embodiment, a method comprises receiving a first operand and a second operand with alignment unit within a processor. The first operand includes a first significand and a first exponent associated with a first decimal floating-point number, and the second operand includes a second significand and a second exponent associated with a second decimal floating-point number. The method further comprises aligning the first significand and the second significand with the alignment unit so that the first exponent and the second exponent have an equal value, and computing a resultant decimal floating-point number from the aligned first and second significands and the equal value of the first exponent and the second exponent.

In another embodiment, a method comprises processing with an adder a first significand associated with a first decimal floating-point number and a second significand associated with a second decimal floating-point number to produce a resultant significand. The method further comprises generating one or more flag bits with a flag generation unit to indicate a bit within resultant significand to which a carry will propagate as a result of the addition, adjusting the resultant significand with a correction unit to produce a corrected significand based on the flag bits, and outputting a resultant decimal floating-point number from the corrected significand.

In another embodiment, a decimal floating-point adder comprises a binary adder that adds a first significand associated with a decimal first floating-point number and a second significand associated with a second decimal floating-point number to produce a sum in binary form. The decimal floating-pint adder further comprises a flag generation unit that outputs one or more flag bits to indicate a bit within resultant significand to which a carry will propagate as a result of the addition, and a correction unit that adjusts the sum to produce a corrected significand based on the flag bits.

In another embodiment, a method comprises adding a first significand associated with a first decimal first floating-point number and a second significand associated with a second decimal floating-point number to produce a resultant significand. The first and second significands have a number of bits to store a plurality of decimal digits and the resultant significand has a number of bits to store the decimal digits plus a guard buffer to store an additional decimal digit and an additional bit to store a most significant carry-out. The method further comprises shifting the resultant significand toward a least significant digit when either of the carry-out or the guard buffer contains a non-zero value, and outputting a resultant decimal floating-point number based on the shifted resultant significand.

In another embodiment, a processor comprises a binary adder that adds a first significand associated with a first floating-point number and a second significand associated with a second floating-point number to produce a resultant significand. The first and second significands have a number of bits to store a plurality of decimal digits and the resultant significand has a number of bits to store the decimal digits plus a guard buffer to store an additional decimal digit and an additional bit to store a most significant carry-out. The processor further comprises a shift unit that shifts the resultant significand toward a least significant digit when either the carry-out or the guard buffer contains a non-zero value.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
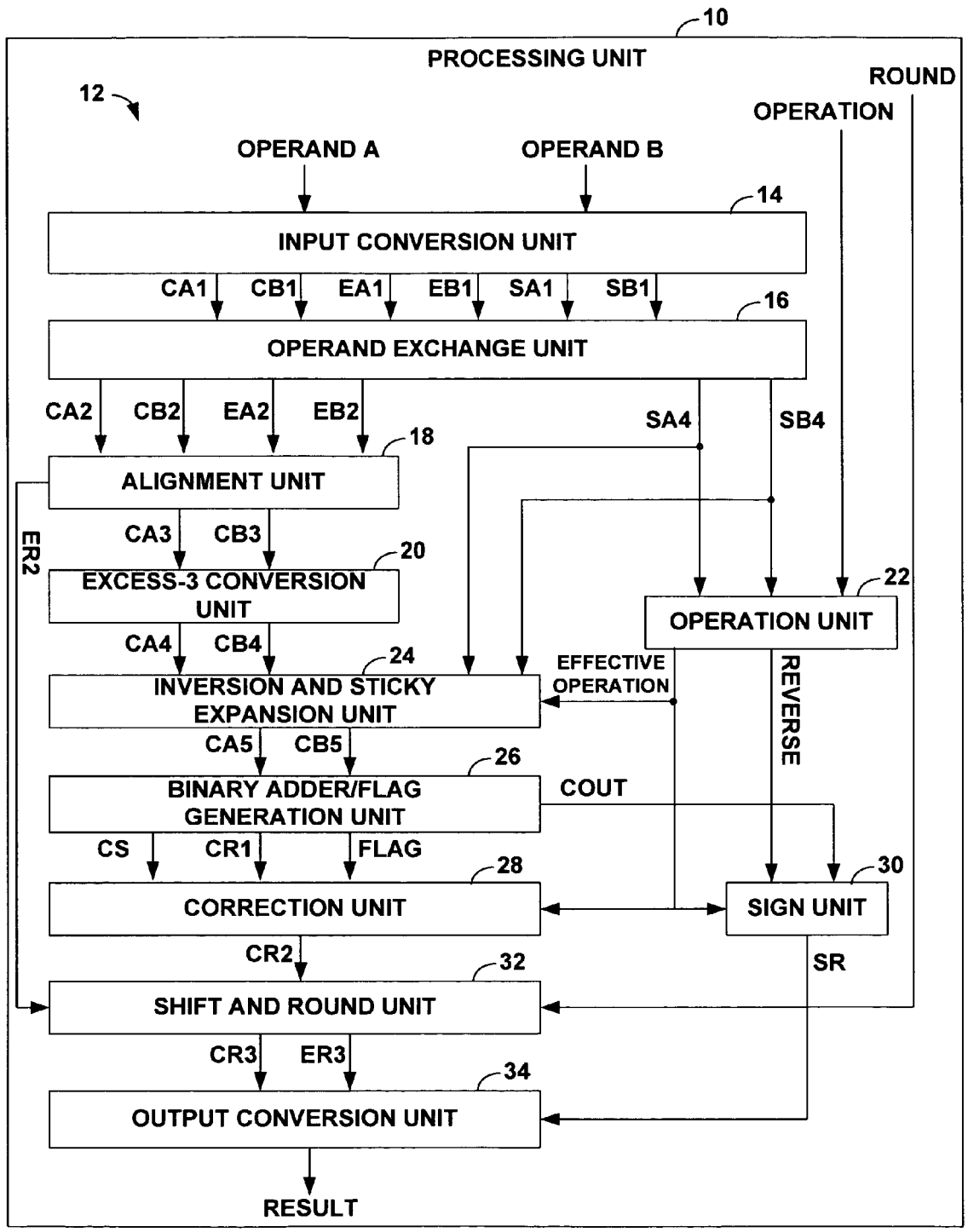
FIG. 1 is a block diagram illustrating a processing unit that performs decimal arithmetic in accordance with the invention.

FIG. 1 is a block diagram illustrating an example embodiment of a processing unit 10 that performs decimal arithmetic in accordance with the techniques described herein. In particular, FIG. 1 illustrates a portion of processing unit 10 that includes a floating-point adder 12 for performing decimal arithmetic. For ease of illustration, adder 12 is described in reference to FIG. 1 as a 64-bit decimal floating-point adder. Adder 12 may, however, be modified to support arithmetic operations on decimal floating-point numbers of different bit lengths, such as 32-bit or 128-bit decimal floating-point numbers.

As described herein, adder 12 can be pipelined to have a critical path that is only slightly greater than a 64-bit fixed-point binary adder. Moreover, the described techniques allow adder 12 to produce a complete result of a decimal addition every clock cycle instead of computing only a single digit of the result every clock cycle. As a result, adder 12 may be especially suited for numerically intensive commercial applications.

In the illustrated embodiment, adder 12 includes an input conversion unit 14, an operand exchange unit 16, an alignment unit 18, an excess-3 conversion unit 20, an operation unit 22, an inversion and sticky expansion unit 24, a binary adder/flag generation unit 26, a correction unit 28, a sign unit 30, a shift and round unit 32 and an output conversion unit 34.

Input conversion unit 14 receives two operands, "OPERAND A" and "OPERAND B," and converts the significands of each of the operands to binary coded decimal (BCD). The input operands are decimal floating-point numbers and may conform, for example, to the 64-bit decimal floating point numbers specified in the IEEE-754 standard for floating-point arithmetic. In that case, input conversion unit 14 converts the two floating-point numbers (i.e., OPERAND A and OPERAND B) into corresponding sign-bits (SA1 and SB1), 10-bit biased binary exponents (EA1 and EB1), and 16-digit significands (CA1 and CB1). The 16-digit significands CA1 and CB1 are represented by 64 bits and, more particularly, 4 bits represent each of the 16 digits of the significands using a BCD encoding.

Sign-bits SA1 and SB1, 10-bit biased binary exponents EA1 and EB1, and 16-digit significands CA1 and CB1 are input to operand exchange unit 16. In general, operand exchange unit 16 processes the unpacked operands to ensure that the operands are ordered according to their exponent values, i.e., EA1 and EB1. Specifically, operand exchange unit 16 exchanges the two operands when EB1 is greater than EA1, thereby ensuring that the exponent of the first exchanged operand, i.e., EA2 is always greater than or equal to the exponent of the second exchanged operand, i.e., EB2. Operand exchange unit 16 may be implemented, for example, using a comparator that compares EA1 and EB1 and sends a selection signal to two multiplexers, each of which inputs the significands, exponents, and signs from both operands. The BCD significands and the binary exponents, which may be potentially exchanged, output by operand exchange unit 16 are denoted CA2, CB2, EA2, and EB2 in FIG. 1, while the sign bits are denoted as SA4 and SB4.

Alignment unit 18 aligns the significands CA2 and CB2 such that their corresponding exponents are equal. As will be described in detail below, alignment unit 18 determines the largest number of digits by which CA2 can be shifted toward the most significant digit, thus decreasing its exponent EA2 towards the value of the lesser exponent EB2. Alignment unit 18 also determines if and by how many digits to shift significand CB2 toward the least significant digit in order to complete the alignment process. As significand CB2 is shifted toward the least significant digit, corresponding exponent EB2 increases toward EA2. If any digits in EB2 are shifted past the least significant digit, they are shifted into a round digit that is to the right of the least significant digit. Digits shifted past the round digit are accumulated using a sticky bit, which is set to one if any non-zero digits are shifted past the round digit. Alignment unit 18 may selectively shift both of the operands in parallel. The significand that is associated with the larger exponent, i.e., CA2, is shifted toward the most significant digit and the operand associated with the smaller exponent, i.e., CB2, is shifted toward the least significant digit until the two significands have associated exponents that are equal. Alignment unit 18 outputs the aligned significands CA3 and CB3 as well as the common exponent ER2.

Excess-3 conversion unit 20 receives aligned significands CA3 and CB3 and converts them to an excess-3 decimal encoding. Excess-3 conversion unit 20 may, for example, add a constant value of 3 to each digit of both the significands CA3 and CB3. The excess-3 format is an advantageous decimal form due to the fact the excess-3 addition produces a natural decimal carry. In addition, the excess-3 format is "self-complimentary" in that the nine's complement of an excess-3 digit can be obtained simply by inverting the four bits that represent the digit, which is useful when performing subtraction. Both binary adder/flag generation unit 26 and correction unit 28 use the excess-3 format.

While alignment unit 18 aligns the significands and excess-3 conversion unit 20 converts the aligned significands to excess-3, operation unit 22 determines the effective operation based on the operands' signs (SA4 and SB4) and the requested arithmetic operation ("OPERATION"), which signals either addition or subtraction. Operation unit 22 may operate in parallel with alignment unit 18 and excess-3 conversion unit 20, and produces an EFFECTIVE OPERATION output signal representing the effective operation and a REVERSE output signal which indicates whether the sign of the final result should be reversed.

Inversion and sticky expansion unit 24 determines whether an inversion of either of the operands is appropriate based on the EFFECTIVE OPERATION signal received from operation unit 24, and inverts one or both of the operands based on the determination. An inversion of one of the operands may, for example, be appropriate in the case that the effective operation is a subtraction. In addition, inversion and sticky expansion unit 24 may perform an expansion of a "sticky" bit to a 4-bit sticky digit based on its value and the effective operation. As described in further detail below, the 4-bit sticky digit represents an additional least significant digit that is utilized to perform the rounding operation specified by the ROUND input.

Significands CA5 and CB5 are passed from inversion and sticky expansion unit 24 to binary adder/flag generation unit 26, which performs the necessary addition. In parallel with the addition, binary adder/flag generation unit 26 computes flag bits ("FLAG"), which are used by correction unit 28. Although illustrated in integrated fashion, the binary adder and the flag generation unit may be implemented separately. Correction unit 28 adjusts the computed sum CR1 of the addition, based on the flag bits, the effective operation, and CS, which represents the carry-outs of the sum digits.

Shift and round unit 32 determines whether the corrected result CR2 needs to be shifted and rounded. Sign unit 30 determines the sign of the result (SR) in parallel with the operation of shift and round unit 32. Output conversion unit 34 receives the output of shift and round unit 32, i.e., CR3 and ER3, as well as the computed sign of the result (SR), and converts the result to the specifications of IEEE-754 or other decimal floating-point format. Specifically, output conversion unit 34 encodes the results in accordance with the IEEE-754 decimal encoding specification and outputs the encoded decimal floating-point number, completing the decimal floating-point operation.

Processing unit 10 may be a microprocessor or coprocessor for use within a laptop computer, general-purpose computer or high-end computing system. Alternatively, processing unit 10 may be a microcontroller, application specific integrated circuit (ASIC) or other component. Moreover, processing unit 10 may be implemented as a single integrated circuit in which adder 12 constitutes only a portion of the implemented functionality. Alternatively, adder 12 may be implemented in one or more stand-alone integrated circuits. Further, components of processing unit 10 and adder 12 may be implemented as discrete combinatorial logic, logic arrays, microcode, firmware or combinations thereof.

Figure 2A:
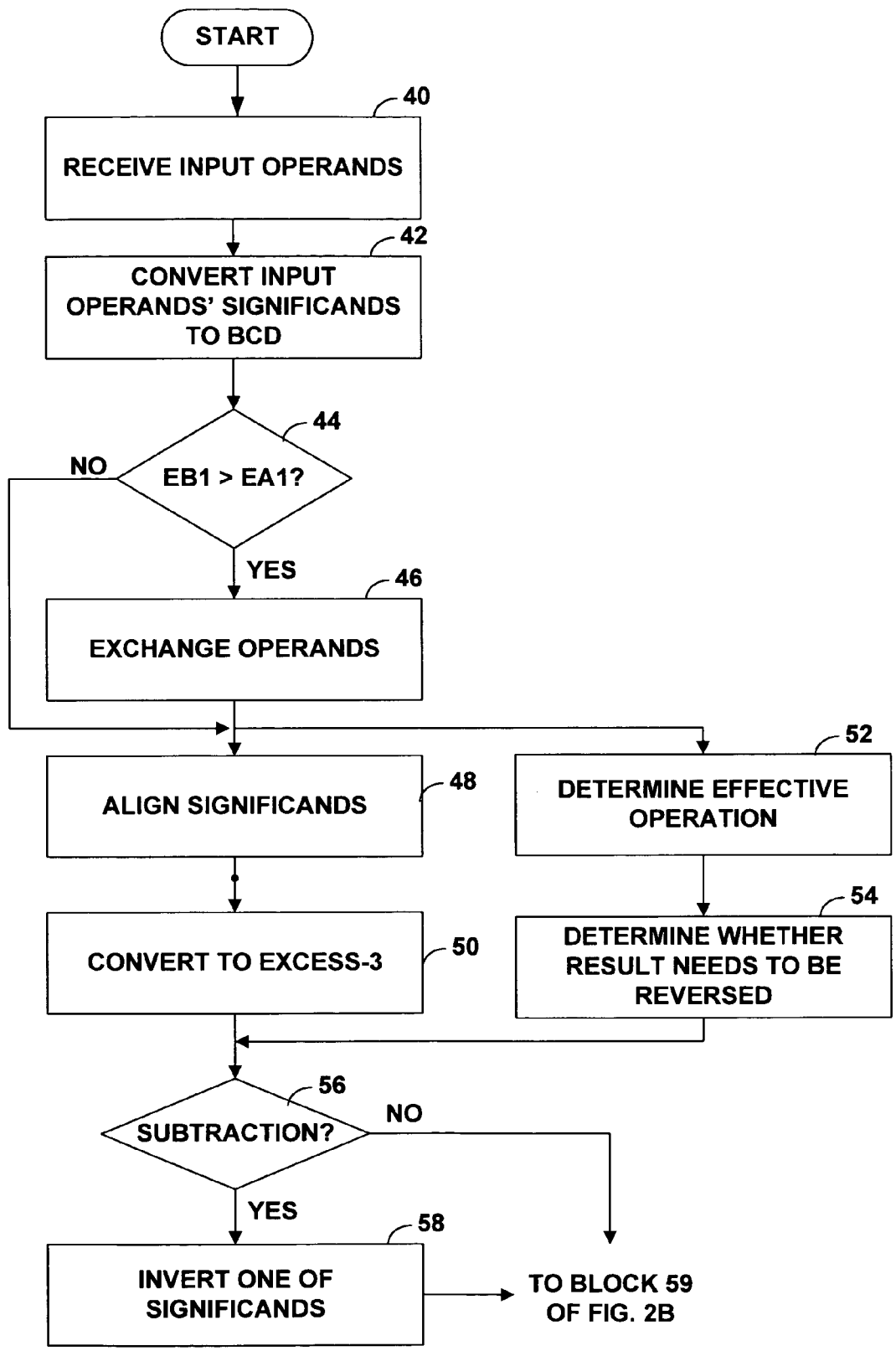
FIGS. 2A and 2B illustrate a flow diagram illustrating exemplary operation of a decimal floating-point adder that performs floating-point arithmetic in accordance with the invention.
Figure 2B:
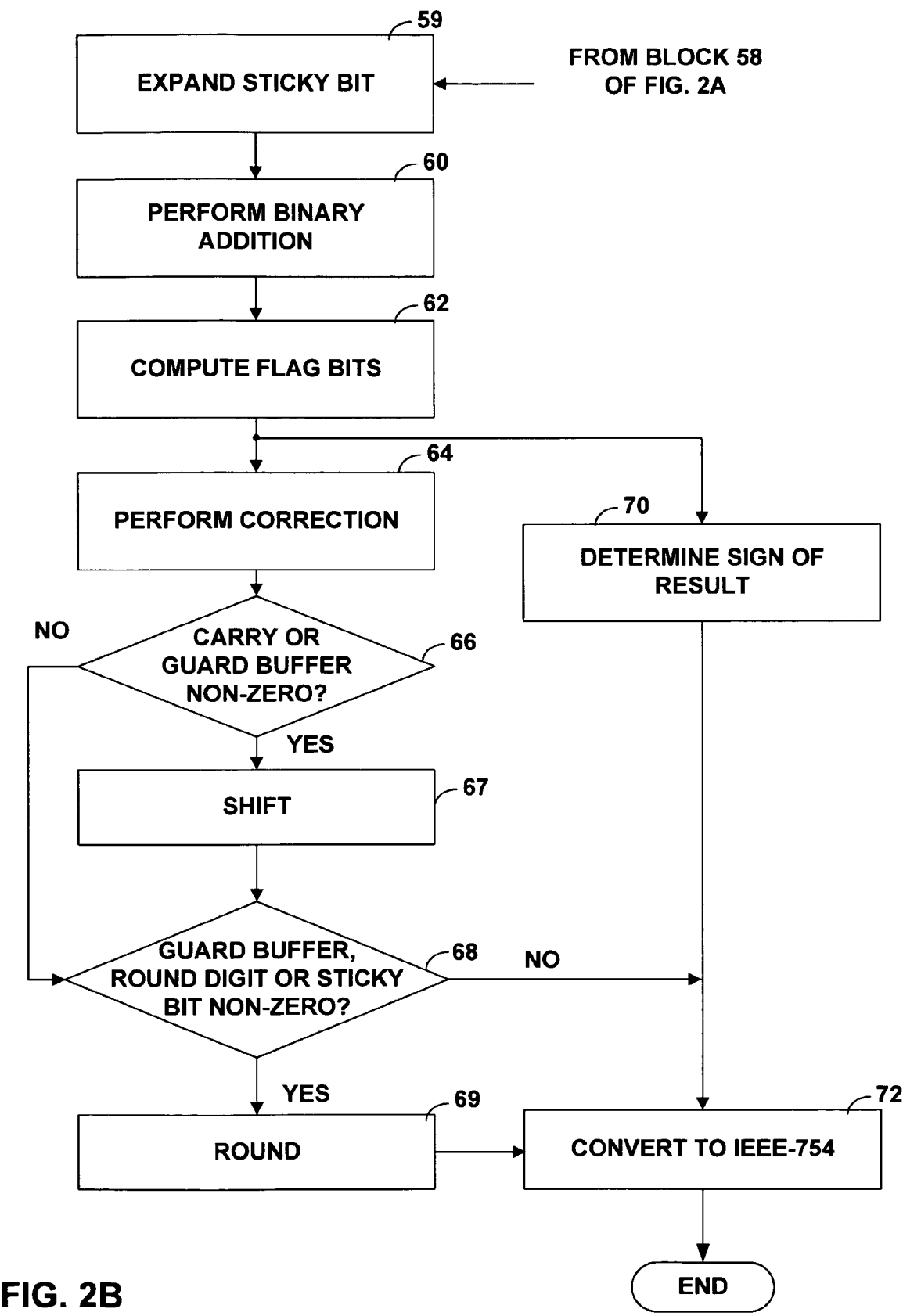

FIGS. 2A and 2B illustrate a flow diagram illustrating exemplary operation of a floating-point adder, such as adder 12 of FIG. 1, that performs floating-point arithmetic in accordance with the techniques described herein. Initially, adder 12 and, more particularly, input conversion unit 14 receives two decimal encoded input operands (40) and converts the significands of each of the operands to unpacked BCD (42). Input conversion unit 14 may, for example receive two input operands that conform to 64-bit decimal floating-point numbers in the IEEE-754 floating-point arithmetic standard and convert the two IEEE-754 decimal encoded operands (e.g., OPERAND A and OPERAND B of FIG. 1) into corresponding sign-bits (SA1 and SB1), 10-bit biased binary exponents (EA1, and EB1), and 16-digit significands (CA1 and CB1).

Next, operand exchange unit 16 determines whether the two converted operands are ordered according to their exponent values, i.e., EA1 and EB1. In one embodiment, operand exchange unit 16 determines whether EB1 is greater than EA1 (44). Operand exchange unit 16 may, for example, comprise a comparator that compares EA1 and EB1. Alternatively, operand exchange unit 16 may perform a subtraction and determine the larger of the two exponents based on the sign of the result. When EB1 is greater than EA1, operand exchange unit 16 exchanges the operands (46).

After exchanging the operands, or after converting the operands to BCD in the case where no exchange is necessary, alignment unit 18 aligns the significands CA2 and CB2 such that their corresponding exponents are equal (48). As described briefly above, alignment unit 18 determines the largest number of digits by which significand CA2 can be shifted toward the most significant digit. In one embodiment, alignment unit 18 calculates the maximum number of digits for the left shift of significand CA2 according to the equation:

$$\text{Left-shift amount} = \min\{EA2-EB2; X-M\}, \quad (1)$$

where EA2 and EB2 are the exponents of the potentially exchanged operands, M is the index of the most significant non-zero digit of significand CA2, and X is the index of the most significant digit available for the operand. For example, in a sixteen-digit implementation X equals seventeen.

Alignment unit 18 also determines if and by how many digits to shift significand CB2 toward the least significant digit in order to complete the alignment process. In one embodiment, alignment unit 18 calculates the number of digits for the right shift of significand CB2 according to the equation:

$$\text{Right-shift amount} = \max\{EA2-EB2+M-X, 0\}, \quad (2)$$

where EA2 and EB2 are the exponents of the potentially exchanged operands, M is the index of the most significant non-zero digit of significand CA2, and X is the index of the most significant digit available for the operand.

Alignment unit 18 may shift significand CA2 or both of the significands CA2 and CB2 in parallel in accordance with the calculated shift values. The significand that is associated with the larger exponent, i.e., CA2, is shifted toward the most significant digit by the left-shift amount calculated and the operand associated with the smaller exponent, i.e., CB2, is shifted toward the least significant digit by the value right-shift amount calculated. Once shifted, the two significands have associated exponents that are equal.

Alignment unit 18 may shift the significands using, for example, barrel shifters. In order to produce the same result that would be obtained if the addition was performed using infinite precision and then rounded, the alignment unit 18 may include a 4-bit guard buffer on the most significant side of CA2 as well as a 4-bit round digit buffer and a 1-bit sticky bit buffer on the least significant digit side of CB2. Alignment unit 18 shifts any non-zero digit through the round digit buffer and into the sticky bit buffer, which are later used for rounding. The sticky bit is set to one if any non-zero digits are right shifted past the round digit.

Excess-3 conversion unit 20 receives aligned significands CA3 and CB3 and converts the significands to an excess-3 decimal encoding (50). Excess-3 conversion unit 20 may, for example, add a constant value of 3 to each digit of both operands. In one embodiment, excess-3 conversion unit 20 may convert a given 4-bit BCD number 'abcd' to the corresponding excess-3 number 'wxyz' using the following equations:

$$w = a'bd + a'bc + abc' \quad (3)$$

$$x = a'bc'd' + b'c'd + a'b'c \quad (4)$$

$$y = b'c'd' + a'c'd' + a'cd \quad (5)$$

$$z = b'c'd' + a'c'd' + a'cd' \quad (6)$$

While alignment unit 18 aligns the significands and excess-3 conversion unit 20 converts the aligned significands to excess-3, operation unit 22 determines the effective operation based on the operands' signs (SA4 and SB4) and the operation input ("OPERTION") (52). Operation unit 18 also determines whether the sign of the final result should be reversed (54). In this particular implementation only two effective operations are necessary; addition and subtraction. The techniques of the invention, however, may be extended to include other arithmetic operations. TABLE 1 illustrates the output signals (EFFECTIVE OPERATION and REVERSE) produced by operation unit 18 based on the sign inputs, i.e., SA4 and SB4, and the OPERATION input.

TABLE 1

| INPUTS | | | OUTPUTS | |
|---|---|---|---|---|
| SA4 | SB4 | OPERATION | EFFECTIVE OPERATION | REVERSE |
| + | + | Add | Add | No |
| + | + | Subtract | Subtract | No |
| + | − | Add | Subtract | No |
| + | − | Subtract | Add | No |
| − | + | Add | Subtract | Yes |
| − | + | Subtract | Add | Yes |
| − | − | Add | Add | Yes |
| − | − | Subtract | Subtract | Yes |

Next, inversion and sticky expansion unit 24 determines whether the effective operation is a subtraction (56) and, if so, inverts one of the significands (58). If the input operands have been exchanged by operand exchange unit 16, the significand that inversion and sticky expansion unit 24 inverts must reflect that previous exchange. In addition, inversion and sticky expansion unit 24 performs an expansion of the sticky bit to a 4-bit digit representation based on its value and the effective operation (59).

Figure 2C:
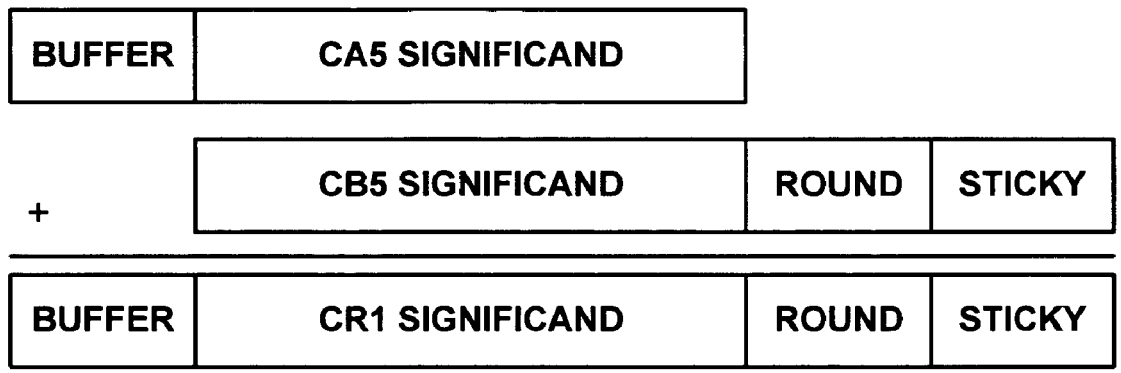
FIG. 2C shows the formats of the input significands received by a binary adder/flag generation unit of the decimal floating-point adder and the resultant sum.

Binary adder/flag generation unit 26 performs the necessary addition on significands CA5 and CB5 received from inversion and sticky expansion unit 24 (60). The addition performed by binary adder/flag generation unit 26 accounts for the 4-bit guard buffer on the most significant digit side of the left-shifted significand as well as the 4-bit round digit and sticky digit buffers on the least significant digit side of the right-shifted significand. In other words, the result from binary adder/flag generation unit 26 includes at least one extra buffer on the most significant digit side of the result as well as a round digit and sticky digit on the least significant digit side of the result. In addition, one extra bit is needed on the most significant digit side of the result to a hold a 1-bit carry-out. The extra bit to hold the carry-out is placed in a position toward the most significant digit of the extra buffer. FIG. 2C shows the formats of input significands received by binary adder/flag generation unit 26 and their resulting sum.

In parallel with the addition, binary adder/flag generation unit 26 computes flag bits (62). The flag bits indicate the most significant bit within sum CR1 to which a carry will propagate as a result of adding one to CR1. In one embodiment, the flag bits take the form of a string of ones followed by a string of zeros, where the string of ones begins with the least significant bit of the sum CR1 and continues until the first zero bit of the sum CR1. In other words, the flag bits indicate the string of bits through which a carry would propagate if added to the least significant bit of the sum CR1. For example, the flag bits that correspond to the binary sum '1111 1011' are '0000 0111,' indicating that a carry would propagate to the third least significant bit of the sum CR1.

Correction unit 28 uses the sum, flag bits and digit carry-outs generated by binary adder/flag generation unit 26 to adjust the result of binary adder/flag generation unit 26 (64). Additionally, the adjustment made by correction unit 28 depends on the effective operation determined by operation unit 22. Correction unit 28 may, for example, include two different rules; one that applies when the effective operation is an addition and one that applies when the effective operation is a subtraction. In one exemplary correction rule for an addition effective operation, correction unit 28 determines where digit carry-outs occur during the addition performed by binary adder 26 and then adjusts each sum digit where there is no digit carry-out by subtracting a corrective value of six from each sum digit. Performing this correction compensates for the initial value of the three that was added to each digit in both significands.

In one exemplary correction rule for a subtraction operation, correction unit 28 determines whether the final carry-out is a one. When the final carry-out is a one, the final result is positive and two corrective measures are taken. First, the flagged bits are inverted. After this, a corrective factor of six is subtracted from each sum digit where the digit carry-out XORed with the digit flag carry-out gives a result of zero. A digit flag carry-out is the most significant bit (MSB) of the four flag bits corresponding to each digit of the result.

When the final carry-out is a zero, the final result is negative and again two corrective measures are taken. First, all of the sum bits are inverted, and secondly, a corrective factor of six is subtracted from all places that have a digit carry-out of one.

Next, shift and round unit 32 determines whether either the carry out from the binary addition or the 4-bit guard buffer on the most significant side of the result is occupied by a non-zero value (66). If either of the two extra buffers contains a non-zero value, shift and round unit 32 performs a right-shift of either one or two digits in order to bring the result back into the representable range of coefficients, which in this case entails a precision of sixteen digits (67). If the carry-out contains a non-zero value, for example, shift and round unit 32 right-shifts CR2 by two digits. Shift and round unit 32 also adjusts the final exponent in conjunction with shifting the result significand. An additional right-shift of one digit may need to be performed to account for a possible carry-out from rounding. This only occurs when the shifted significand is all nines and a one is added to it for rounding. When performing the right shifts, any non-zero digit shifted passed the sticky digit or an initial non-zero sticky digit, causes the sticky bit, which is used for rounding, to be set to one.

To maintain accuracy, shifting is done before rounding. If any of the guard digit, round digit or sticky bit are non-zero, shift and round unit 32 rounds the result (68, 69). Shift and round unit 32 may support a number of rounding modes, including a round to nearest even number, round to nearest up, round to nearest down, round toward positive infinite, round toward negative infinity, round toward zero, and round away from zero. A 3-bit code may be used to specify the rounding mode. For all rounding modes the 4-bit round digit and the 1-bit sticky bit (collective, "RS") are truncated and the truncated result is either incremented by one or left unchanged. The increment operation is performed in a carry-lookahead fashion, in which a parallel-prefix tree first determines the number of consecutive nines starting at the least significant digit of the shifted result. Then, this information is used to quickly generate a value that is the truncated result plus one. The increment condition for each of the rounding modes is described in TABLE 2, wherein RS indicates a 4-bit round digit and a 1-bit sticky, R indicates a 4-bit round digit, LSD indicates the least significant digit of the result, and S indicates a 1-bit sticky digit.

TABLE 2

| ROUND MODE | INCREMENT CONDITION |
| --- | --- |
| Round to nearest even | R > 5 \| (R = 5 & LSD[0] = 1 \| S != 0) |
| Round to nearest up | RS >= 50 |
| Round to nearest down | RS >5 0 |
| Round toward positive infinity | (result >= 0) & (RS != 0) |
| Round toward negative infinity | (result < 0) & (RS != 0) |
| Round toward zero | None |
| Round away from zero | RS != 0 |

Sign unit 30 determines the sign of result (SR) in parallel with the operation of shift and round unit 32 (70). Sign unit 30 receives the EFFECTIVE OPERATION signal and the REVERSE signal from operation unit 22 and a COUT signal from binary adder 26. Based on these inputs, sign unit 30 determines the sign of the result according to TABLE 3.

TABLE 3

| INPUTS | | | OUTPUT |
| --- | --- | --- | --- |
| EFFECTIVE OPERATION | REVERSE | COUT | SIGN OF RESULT (SR) |
| Add | No | 0 | + |
| Add | No | 1 | + |
| Add | Yes | 0 | − |
| Add | Yes | 1 | − |
| Subtract | No | 0 | − |
| Subtract | No | 1 | + |
| Subtract | Yes | 0 | + |
| Subtract | Yes | 1 | − |

Finally, output conversion unit 34 inputs the output of shift and round unit 32, i.e., CR3 and ER3, as well as the computed sign of the result (SR), and converts the input to the decimal specifications of IEEE-754 or other decimal floating-point format (72). Although the flow diagrams of FIGS. 2A and 2B illustrate progression of a single decimal arithmetic operation sequentially, adder 12 may be pipelined so that output conversion unit 34 produces a complete result each clock cycle once the pipeline is fully primed.

Figure 3:
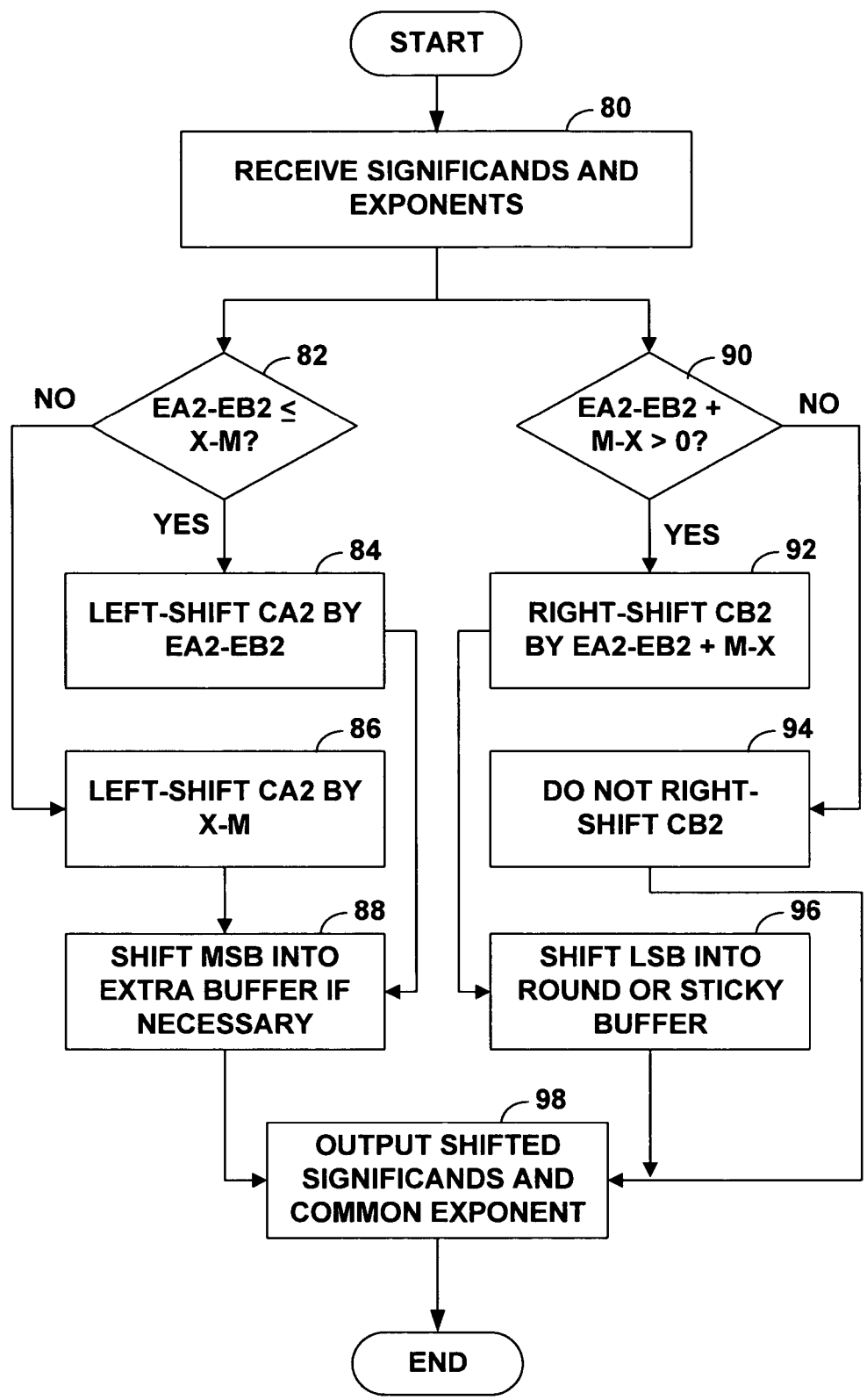
FIG. 3 is a flow diagram illustrating an exemplary operation of an alignment unit of the decimal floating-point adder of FIG. 1.

FIG. 3 is a flow diagram illustrating exemplary operation of alignment unit 18 in further detail. Initially, alignment unit 18 receives significands CA2 and CB2 as well as binary exponents EA2 and EB2 associated with CA2 and CB2, respectively (80), from operand exchange unit 16.

Next, alignment unit 18 left shifts CA2 and right shifts CB2, as necessary, in parallel until the exponents are aligned. In particular, alignment unit 18 performs left shifts CA2 the minimum of EA2−EB2 and X−M in accordance with equation 1. For example, alignment unit 18 may determines whether EA2−EB2 is less than or equal to X−M (82). When EA2−EB2 is less than or equal to X−M, alignment unit 18 shifts CA2 toward the most significant digit by EA2−EB2 digits (84). However, when EA2−EB2 is greater than X−M, alignment unit 18 shifts CA2 toward the most significant digit by X−M digits (86). During the left shift, alignment unit 18 may shift a most significant digit (MSD) of CA2 into the extra 4-bit guard buffer (88). The existence of the extra guard buffer toward the most significant digit of the most significant digit position allows adder 12 to produce the same result that would be produced if the result was computed to infinite precision and then rounded.

In parallel with the left shifting of CA2, alignment unit 18 right shifts CB2 when necessary based on the maximum of EA2−EB2 and M−X. For example, alignment unit 18 may initially determine whether EA2−EB2+M−X is greater than zero (90). When EA2−EB2+M−X is greater than zero, alignment unit 18 shifts CB2 toward the least significant digit by EA2−EB2+M−X bits (92). During the right shift of CB2, alignment unit 18 may shift one or more digits into extra buffers toward the least significant digit of the least significant digit (LSB) position CB2 (96). For example, alignment unit 18 may include a round digit buffer and a sticky bit buffer toward the least significant digit of the LSB position of CB2, and shift digits into either or both of the buffers. When EA2−EB2+M−X is not greater than zero, alignment unit 18 does not shift CB2 (94). In this case, the left-shift operation of significand CA2 is sufficient to align the two significands and CB2 need not be shifted.

After the significands are shifted such that both significands have the same binary exponent, alignment unit 18 outputs the aligned significands to excess-b 3 conversion unit 20 and outputs the common exponent to shift and round unit 32 (98).

As an example, consider operation of alignment unit 18 upon receiving the following input:

CA2=0500 0000 0000 0000,

CB2=0000 0000 0004 3720,

EA2=6, and

EB2=0.

Taking into account the available significand buffers (i.e., the 4-bit guard buffer toward the most significant digit position of CA2 and the 4-bit round digit buffer toward the least significant digit position of CB2) and the sticky bit buffer toward the least significant digit of the round digit buffer, the two input significands are represented as:

CA2=0 0500 0000 0000 0000

CB2=0000 0000 0004 3720 00

Using equation (1), alignment unit 18 determines that CA2 must be left-shifted by two digits:

left-shift amount=min{6−0, 17−15}=2.

In parallel, alignment unit 18 uses equation (2) to determine that CB2 must be right-shifted by 4 digits:

right-shift amount=max {6−0+15−17, 0}=4.

Alignment unit 18 shifts CA2 left toward the most significant digit and and CB2 right toward the least significant digit by their respective amounts. In particular, CA2 is shifted toward the most significant digit by 2 digits and CB2 is shifted toward the least significant digit by 4 digits. The resulting significands (CA3 and CB3) and their common binary exponent (ER3) produced by alignment unit 18 are illustrated below:

CA3=5 0000 0000 0000 0000,

CB3=0000 0000 0000 0004 31, and

ER3=4.

The shifting of the significands does not affect the result unless non-zero digits are shifted out of the 64-bit (16-digit) significand field. In this case, one non-zero digit is shifted out of CB3. To compensate for shifting these digits out of the significand field, however, these digits are shifted through the round digit buffer and sticky bit buffer, which are later used for rounding.

Figure 4:
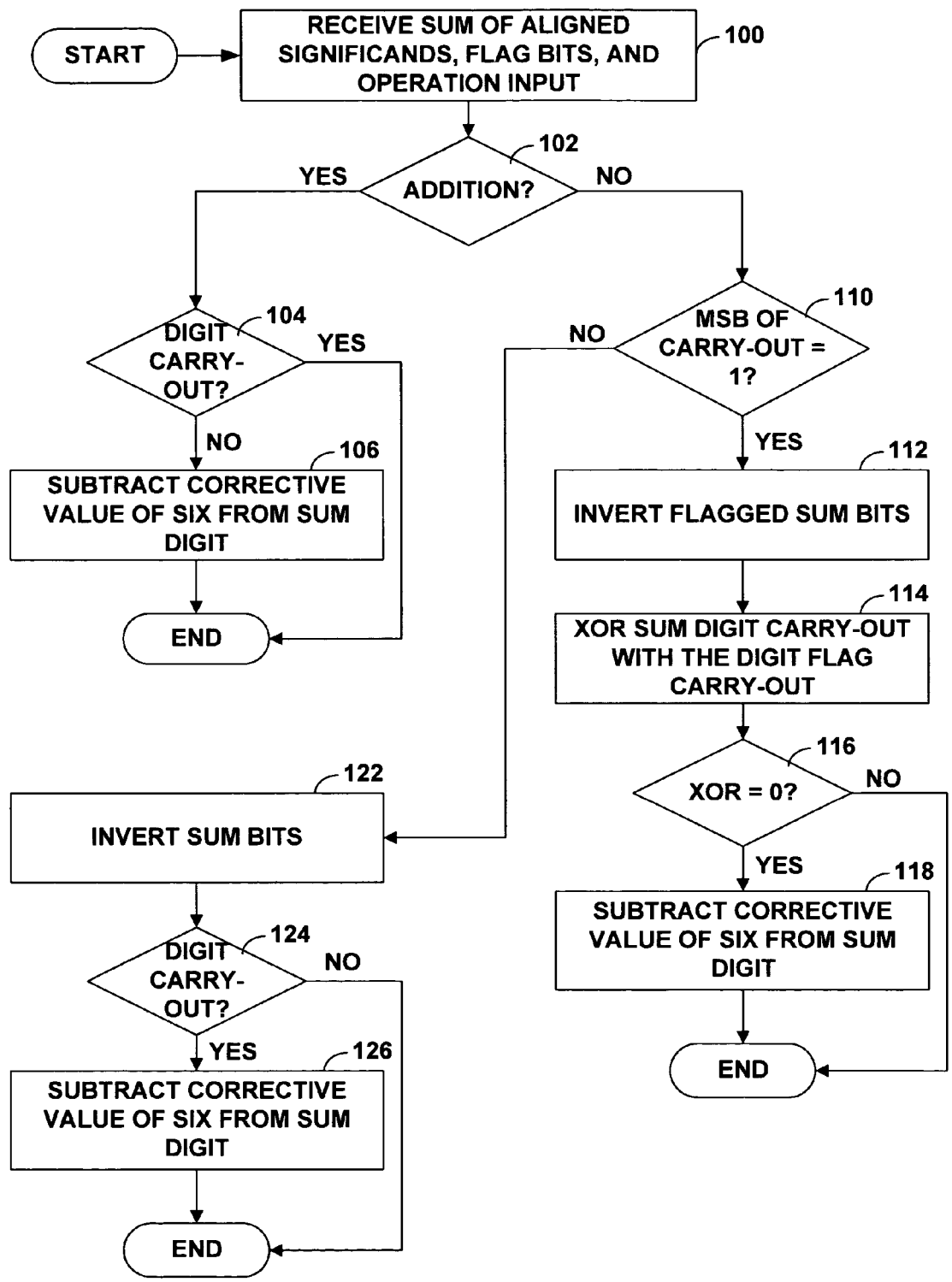
FIG. 4 is a flow diagram illustrating exemplary operation of a correction unit of the decimal floating-point adder of FIG. 1.

FIG. 4 is a flow diagram illustrating exemplary operation of correction unit 28 of FIG. 1 in further detail. Initially, correction unit 28 receives a sum of the aligned significands and flag bits from binary adder 26 as well as the effective operation bit from operation unit 22 (100).

Next, correction unit 28 determines whether the operation is an addition based on the effective operation signal from operation unit 22 (102). When the effective operation is an addition, correction unit 28 determines whether there is a digit carry-out for each of the digits (104). Correction unit 28 subtracts a corrective value of six from each of the sum digits that does not have a digit carry-out (106). Correction unit 28 may, for example, add 1010 to each of the sum digits that does not have a digit carry-out, which effectively subtracts a corrective value of six. When a resultant digit has a digit carry-out, correction unit 28 does not perform any adjustment on the digit.

When the effective operation is a subtraction, correction unit 28 determines whether the carry-out of the most significant digit is a 1 (110). When the carry-out of the most significant digit is a 1, the final result must be positive and two corrective measures are taken. First, correction unit 28 inverts flagged sum bits, i.e., sum bits that correspond to set flag bits (112). Next, correction unit 28 performs an exclusive OR (XOR) operation with the sum digit's carry-out and the flag carry-out corresponding to that digit (114). Correction unit 28 determines, for each sum digit, whether the XOR operation of the sum digit's carry-out and the flag carry-out for that digit gives a result of zero (116). Correction unit 28 subtracts a corrective value of six from each of the sum digits for which the XOR operation of the sum digit carry-out and the flag carry-out results in a zero (118). When the XOR operation of the sum digit's carry-out and the flag carry-out for that digit does not have a zero result, correction unit 28 does not perform any adjustment on the sum digits.

When the carry-out of the most significant digit is not a 1, the final result must be negative and two corrective measures are needed. First, correction unit 28 inverts all the sum bits (122). Correction unit 28 then determines which of the sum digits have a digit carry-out (124). For each digit having a digit carry-out, correction unit 28 subtracts a corrective value of six from the corresponding sum digit (126). Correction unit 28 does not perform any adjustment on the sum digits that do not have a digit carry-out.

The following examples demonstrate exemplary operation of correction unit 28 making corrections in accordance with the techniques of the invention. In the first example, correction unit 28 adjusts the output of binary adder 26 during the addition of floating-point numbers 953 and 642. The inputs to binary adder 26 and the result output from binary adder 26 for an addition operation are illustrated below:

$$
\begin{array}{rllll}
CA5 = & 1100 & 1000 & 0110 & [953] \\
+CB5 = & 1001 & 0111 & 0100 & [642] \\
\hline
CR1 = & 0101 & 1111 & 1011 & \\
Cout = & 1000 & 0000 & 0100 & \\
CS = & 1 & 0 & 0 &
\end{array}
$$

CR1 is the result of the addition of significands CA5 and CB5. Cout represents the carry-outs of each of the bits, while CS represents the carry-outs of the sum digits.

As described above, correction unit 28 determines whether there is a digit carry-out for each of the digits. As illustrated by the value of '1' in Cs, only the most significant digit of the three digits has a digit carry-out. Correction unit 28 subtracts a corrective value of six from each of the sum digits that does not have a digit carry-out, i.e., the two least significant digits in this case, to produce a corrected result (CR2).

$$
\begin{array}{rllll}
CR1 = & 0101 & 1111 & 1011 & \\
+\text{Correction} = & 0000 & 1010 & 1010 & \\
\hline
CR2 = & 10101 & 1001 & 0101 & [1595]
\end{array}
$$

In a second example, correction unit 28 adjusts the output of binary adder 26 during the subtraction of floating-point numbers 548 and 169. The inputs to binary adder 26, the inverted version of significand CB5, i.e., CB5', the bit carry-outs (Cout), the sum digit carry-outs (Cs), the flag bits, the carry-outs of the flag bits (Cf), and the result output from binary adder 26 (CR1) for the subtraction operation are illustrated below:

$$
\begin{array}{rllll}
CA5 = & 1000 & 0111 & 1011 & [548] \\
+CB5 = & 0100 & 1001 & 1100 & [169] \\
CB5' = & 1011 & 0110 & 0011 & \\
\hline
CR1 = & 0011 & 1101 & 1110 & \\
Cout = & 1000 & 0110 & 0011 & \\
Cs = & 1 & 0 & 0 & \\
\text{Flag} = & 0000 & 0000 & 0001 & \\
Cf = & 0 & 0 & 0 &
\end{array}
$$

As described above with respect to a subtraction operation, correction unit 28 determines whether the sum digit carry-out of the most significant digit is a '1.' When the carry-out of the most significant digit is a '1,' as it is in this case, correction unit 28 inverts flagged sum bits of the result CR1. Note that the only flagged sum bit is the least significant digit, which was inverted to give the adjusted result shown below.

CR1 adj=0011 1101 1111

Correction unit 28 then determines, for each sum digit, whether the XOR operation of the sum digit carry-out (Cs) and the flag carry-out (Cf) gives a result of zero and subtracts a corrective value of six from each of the sum digits for which the XOR operation of the sum digit carry-out and the flag carry-out results in a zero. In the illustrated example, the XOR of the two least significant digits results in a zero and thus the correction is as illustrated below.

$$
\begin{array}{rl}
CR1\ adj = & 0011\ \ 1101\ \ 1111 \\
+\text{Correction} = & 0000\ \ 1010\ \ 1010 \\
\hline
CR2 = & 0011\ \ 0111\ \ 1001\ \ [379]
\end{array}
$$

In a third example, correction unit 28 adjusts the output of binary adder 26 during the subtraction of floating-point numbers 527 and 926. The inputs to binary adder 26, the inverted version of significand CB5, i.e., CB5', the bit carry-outs (Cout), the sum digit carry-outs (Cs), and the result output from binary adder 26 (CR1) for the subtraction operation are illustrated below:

$$
\begin{array}{rl}
CA5 = & 1000\ \ 0101\ \ 1010\ \ [527] \\
+CB5 = & 1100\ \ 0101\ \ 1001\ \ [926] \\
CB5' = & 0011\ \ 1010\ \ 0110 \\
\hline
CR1 = & 1100\ \ 0000\ \ 0000 \\
Cout = & 0011\ \ 1111\ \ 1110 \\
Cs = & 0\ \ \ \ \ \ 1\ \ \ \ \ \ 1
\end{array}
$$

The carry-out of the most significant digit is a not '1' in this case. Thus, correction unit 28 inverts all the sum bits of the result CR1 as illustrated by CR1 adj below CR1 adj=0011 1111 1111

Correction unit 28 subtracts a corrective value of six from each of the sum digits with carry-out. In the illustrated example, the two least significant digits have a carryout and thus the correction is as illustrated below.

$$
\begin{array}{rl}
CR1\ adj = & 0011\ \ 1111\ \ 1111 \\
+\text{Correction} = & 0000\ \ 1010\ \ 1010 \\
\hline
CR2 = & 0011\ \ 1001\ \ 1001\ \ [-399]
\end{array}
$$

Figure 5:
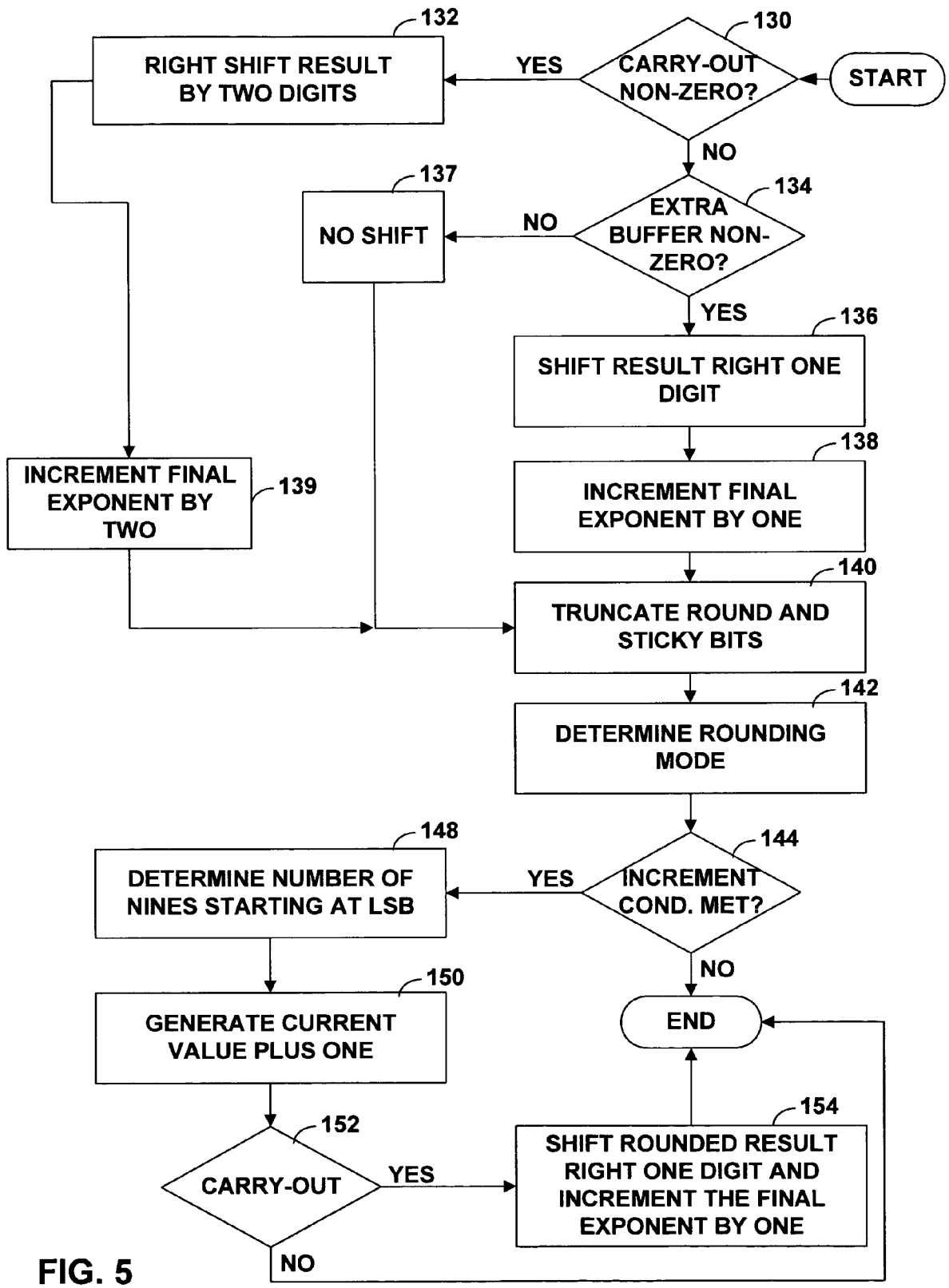
FIG. 5 is a flow diagram illustrating exemplary operation of a shift and round unit of the decimal floating-point adder of FIG. 1.

FIG. 5 is a flow diagram illustrating exemplary operation of shift and round unit of FIG. 1 in further detail. In general, once the addition is complete, the result may need to be adjusted in the case that either of the two extra buffers on the most significant side of the result is occupied by values other than zero. In this case, a right-shift of either one or two digits will be executed in order to bring the result back into the representable range of coefficients, which in this case entails a precision of sixteen digits. As was the case for significand alignment, the final exponent is adjusted in conjunction with shifting the result significand.

Specifically, shift and round unit 32 initially receives the result (CR2) from correction unit 28 and determines whether a carry-out buffer of the result is non-zero (130). When the carry-out buffer is non-zero, shift and round unit 32 right shifts the corrected result CR2 by two digits (132). In particular, shift and round unit 32 shifts the value contained in the carry-out buffer two digits in the direction of the least significant digit.

When the carry-out buffer holds a zero, shift and round unit 32 determines whether the extra buffer toward the least significant digit of the carry-out buffer is non-zero (134). When the extra buffer is not a non-zero value, shift and round unit 32 shifts the corrected result (CR2) one digit toward the least significant digit (136). When the extra buffer holds a zero, shift and round unit 32 performs no shift on the corrected result (137).

If shift and round unit 32 performs a shift of the corrected result, shift and round unit 32 must also adjust the final exponent accordingly. Specifically, shift and round unit 32 must increment the final exponent by two when result is shifted two digits (139) and increment the final exponent by one when the result is shifted by one digit (138).

Next, shift and round unit 32 truncates the round and sticky digit buffers (140). Shift and round unit 32 determines which rounding mode shift and round unit 32 is in (142), and determines whether an increment condition associated with the rounding mode is met (144). As previously described, shift and round unit 32 may support a number of rounding modes, some of which are listed in TABLE 2 above.

When the increment condition associated with the rounding mode is not met, the truncated result is used. When the increment condition is met, shift and round unit 32 determines the number of consecutive nines starting at the least significant digit (148), and generates a value equal to the truncated result plus one using this information (150). The increment operation may be performed in a carry-lookahead fashion in which a parallel-prefix tree determines the number of consecutive nines starting at the least significant digit of the shifted result.

Finally, shift and round unit 32 determines whether there is a carry-out on the rounded result (152). This only occurs when the shifted significand is all nines and a one is added to it for rounding. When there is a carry-out on the rounded result, shift and round unit 32 shifts the rounded result one digit toward the least significant digit and increments the exponent by one (154).

Simulation Results

The described decimal floating-point adder was modeled in Verilog at the register transfer level. Functional testing was performed on several corner cases as well as on over one million random cases. In particular, the signs, operations, rounding modes, and significand values used during the test were randomly generated. The exponents were generated with a weighted algorithm so that there was a very small chance that either operand would become zero after alignment.

Initial synthesis testing and comparison has been performed using a 0.11 micron CMOS standard cell library. Using this library, the design was first synthesized as a single combinational block without any optimization flags set to identify the delay contributions of each component in the overall design.

Figure 6:
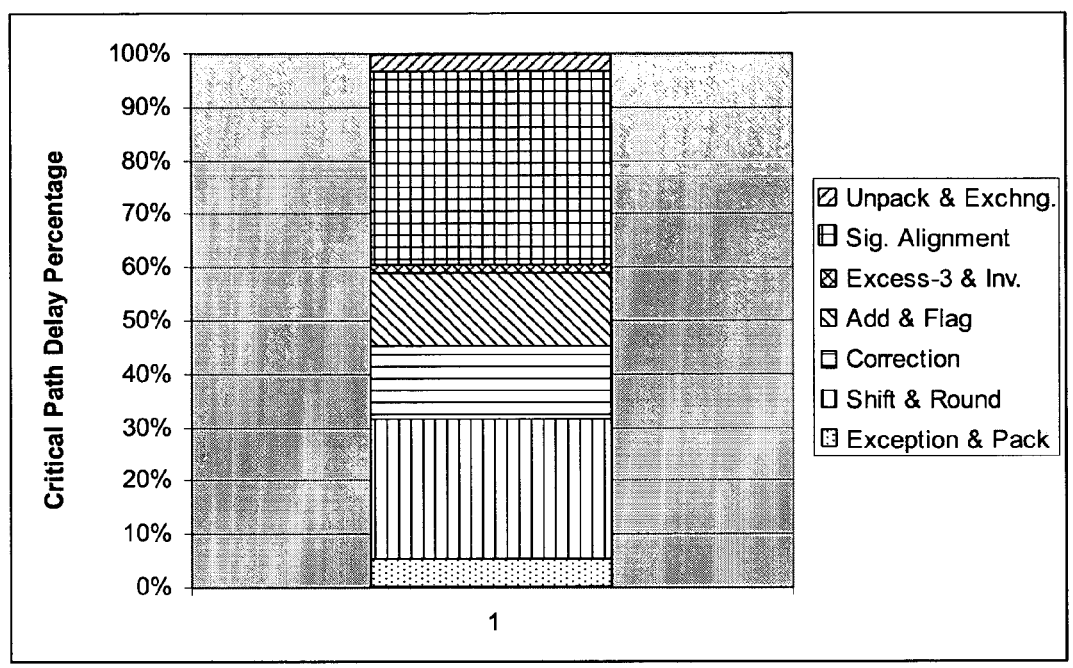
FIGS. 6-8 are graphs presenting simulation and synthesis results for the decimal floating-point adder.

FIG. 6 is a graph that illustrates the contributions that each component provides to the critical path delay of the purely combinational (non-pipelined) design. It should be noted that the unpacking and operand exchange as well as the conversion to excess-3, inversion, and sticky expansion are combined in this figure due to their delay minimal contributions. It should also be noted that while the significand alignment process consumes approximately 42% of the critical path delay, roughly 84% of this time, or 36% overall, is spent determining the shift amounts, while the remainder is spent actually performing the shifts.

It is estimated that, in the simulated embodiment, the combinational adder portion of the design has a critical path delay of 0.6 ns. This estimate has been supported though the synthesis of a Cogged-Stone adder block by itself.

Figure 7:
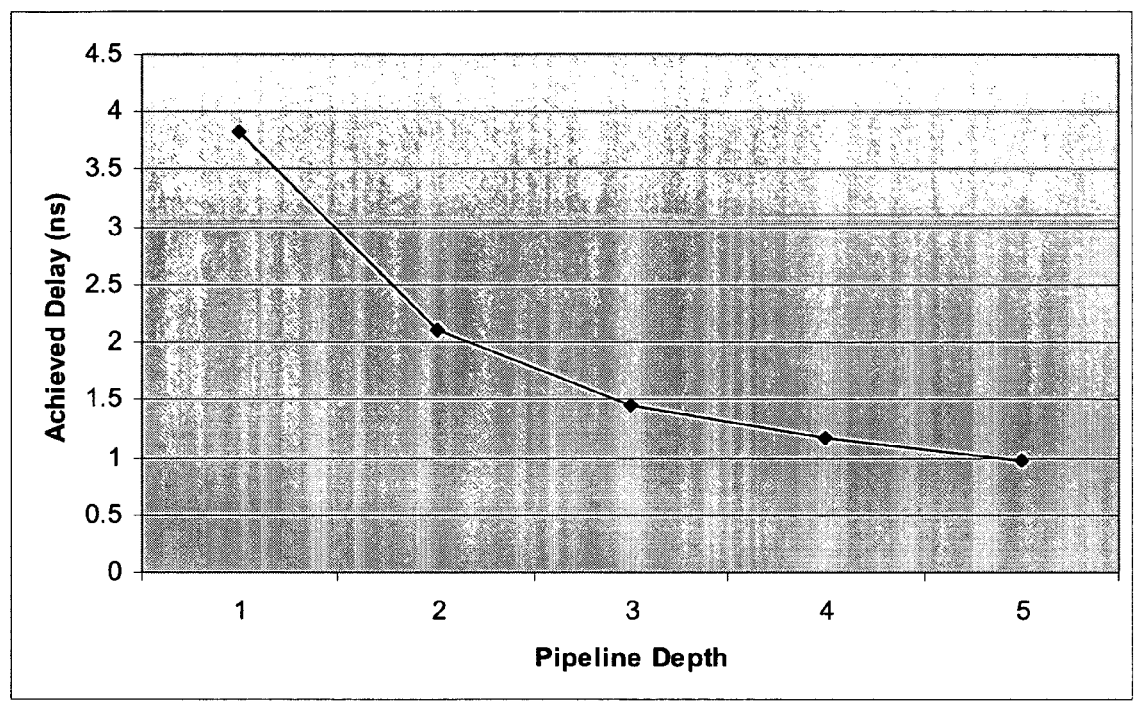
Figure 8:
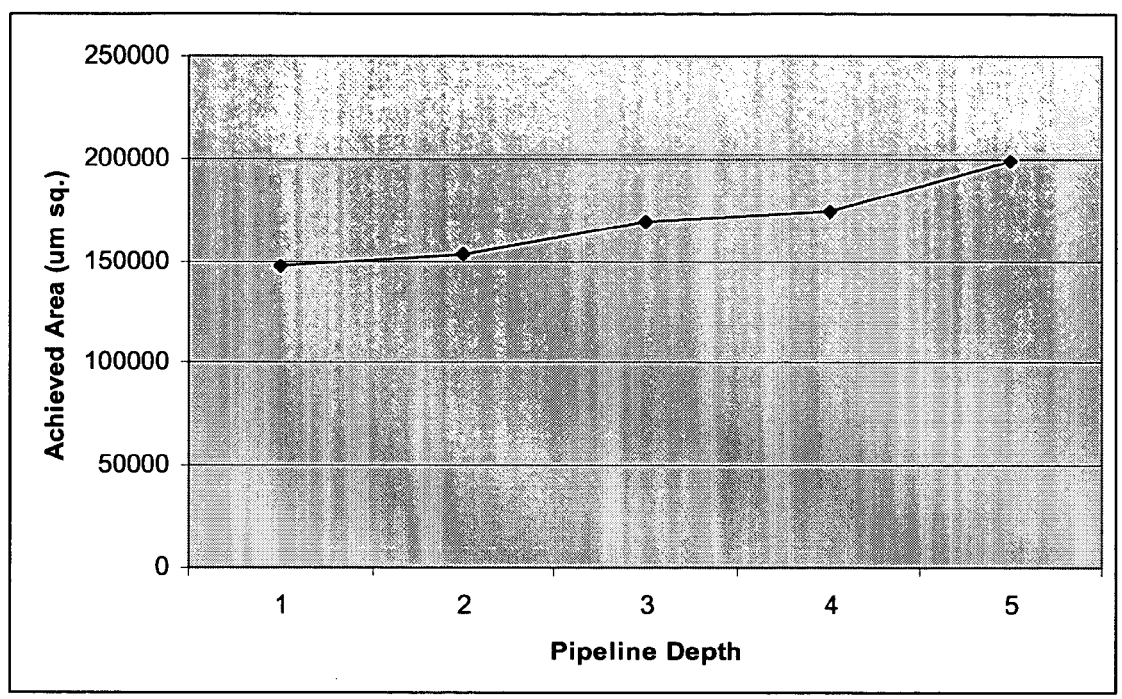

In addition to evaluating the purely combinational design with very low effort synthesis, several higher effort pipelined designs, all of which are optimized for delay, have been evaluated. More specifically, embodiment of the decimal floating-point adder has been synthesized into pipelines of length one (no pipelining), two, three, four, and five. These synthesized configurations have provided insight into the tradeoffs between critical path delay, area, and latency for various pipeline depths of our design. FIG. 7, for example, illustrates critical path delay versus pipeline depth for the synthesized embodiments. FIG. 8 plots the corresponding area for each synthesized pipelined embodiment for the particular 0.11 micron CMOS standard cell library.

The results provided in FIGS. 7 and 8 show that in the simulated embodiments a purely combinational decimal floating-point adder has a critical path delay of 3.83 ns and an area of 0.148 mm$^2$, while an embodiment with five pipeline stages has a critical path delay of 0.98 ns and a corresponding area of 0.199 mm$^2$. As one example, input conversion unit 14 and operand exchange unit 16 may be implemented in a first stage. Alignment unit 18, excess-3 conversion unit 20 and inversion and sticky expansion unit 24 may be implemented in a second stage. Binary adder/flag generation unit may be implemented in a third stage. Correction unit 28, sign unit 32, and shift and round unit 32 may be implemented in a fourth stage, while output conversion unit 34 may be implemented in a fifth stage. More or less registers may be utilized to increase or decrease the number of stages within the pipeline.

Various embodiments of the invention have been described. These and other embodiments are within the scope of the following claims.

The invention claimed is:

1. A method comprising:
   receiving a first operand and a second operand with an alignment circuit within a processing circuit, wherein the first operand includes a first significand and a first exponent associated with a first decimal floating-point number, and the second operand includes a second significand and a second exponent associated with a second decimal floating-point number;
   aligning the first significand and the second significand with the alignment circuit of the processing circuit so that the first exponent and the second exponent have an equal value, wherein aligning the first significand and the second significand comprises shifting the first significand in parallel with shifting the second significand; and
   computing, with the processing circuit, a resultant decimal floating-point number from the shifted first and second significands and the equal value of the first exponent and the second exponent.

2. The method of claim 1, wherein computing the resultant decimal floating-point number comprises computing an arithmetic summation of the first operand and the second operand.

3. The method of claim 1, wherein computing the resultant decimal floating-point number comprises performing an arithmetic subtraction with the first operand and the second operand.

4. The method of claim 1, wherein aligning the first significand and the second significand comprises:
   shifting the first significand and the second significand when the first exponent does not equal the second exponent; and
   outputting the equal exponent value as a function of the shifting.

5. The method of claim 1, wherein aligning the first significand and the second significand comprises shifting a most significant digit of the first significand into a guard buffer.

6. The method of claim 1, wherein aligning the first significand and the second significand comprises:
   computing a number of digits to shift the first significand toward a most significant digit; and
   shifting the first significand toward the most significant digit by the computed number of digits.

7. The method of claim 6, wherein computing the number of digits to shift the first significand is determined according to the equation:

left-shift amount =min{$EA1-EB2$; $X-M$}, where EA1 and EB2 represents the first and second exponents prior to alignment, respectively, M is an index of a most significant non-zero digit of the first significand, and X is an index of the most significant digit available for the first significand.

8. The method of claim 1, wherein aligning the first significand and the second significand comprises shifting the second significand toward a least significant digit to align the first and second significands.

9. The method of claim 8, further comprising shifting at least one digit of the second significand into a sticky bit buffer.

10. The method of claim 8, further comprising shifting at least one bit of the second significand into a round digit buffer.

11. The method of claim 8, further comprising:
    calculating a number of digits to shift the second significand to align the first and second significands; and
    shifting the second significand toward the least significant digit by the calculated number of digits.

12. The method of claim 11, wherein calculating the number of digits to shift the second significand comprises calculating the number of digits to shift the second significand according to the equation:

right-shift amount =max{$EA1-EB2+M-X$, 0},

EA1 and EB2 are the first and second exponents, respectively, M is the index of a most significant non-zero digit of first significand, and X is the index of the most significant digit available for the first significand.

13. A method comprising:
    processing with an adder circuit a first significand associated with a first decimal floating-point number and a second significand associated with a second decimal floating-point number to produce a resultant significand;
    generating one or more flag bits with a flag generation circuit to indicate a bit within the resultant significand to which a carry propagates as a result of the addition;
    adjusting the resultant significand with a correction circuit to produce a corrected significand based on the flag bits; and
    outputting, with the adder circuit, a resultant decimal floating-point number from the corrected significand.

14. The method of claim 13, wherein generating one or more flag bits comprises:
    identifying one or more digits within the resultant significand at which carry-outs occur due to the addition; and generating the flag bits to include a string of ones and a string of zeros, wherein each of the ones corresponds to a respective one of the bits to which a carry is propagated.

15. The method of claim 14, wherein adjusting the resultant significand comprises adjusting the digits of the resultant significand for which carry-outs occur with a corrective value when an effective operation performed by the adder is arithmetic addition.

16. The method of claim 15, wherein adjusting the resultant significand comprises subtracting the corrective value of six (0110 binary) from each digit for which a carry-out does not occur.

17. The method of claim 16, wherein subtracting a corrective value of six (0110 binary) comprises adding a value of ten (1010 binary) to each digit for which a carry-out does not occur.

18. The method of claim 14, wherein adjusting the resultant significand comprises adjusting the digits of the result of the addition based on the carry-outs and the flag bits when an effective operation performed by the adder is arithmetic subtraction.

19. The method of claim 18, further comprising:
inverting each bit of the resultant significand when a carry-out of the most significant digit is zero; and
subtracting a corrective value of six from each digit of the result that has digit carry-out of one.

20. The method of claim 18, further comprising:
inverting bits of the result that are flagged by the flag bits when a carry-out of a most significant digit of the resultant significand is non-zero;
performing an exclusive OR (XOR) operation on each carry-out for the digits of the resultant significand and the corresponding flag bit; and
subtracting a corrective value of six from each digit of the resultant significand where the result of the XOR operation is a zero.

21. The method of claim 13, wherein processing with the adder circuit comprises processing with a binary adder circuit.

22. A decimal floating-point adder circuit comprising:
a binary adder circuit that adds a first significand associated with a decimal first floating-point number and a second significand associated with a second decimal floating-point number to produce a sum in binary form;
a flag generation circuit that outputs one or more flag bits to indicate a bit within resultant significand to which a carry propagates as a result of the addition; and
a correction circuit that adjusts the sum to produce a corrected significand based on the flag bits.

23. The decimal floating-point adder circuit of claim 22, further comprising an output conversion circuit to convert the sum to decimal form and output a resultant decimal floating-point number based on the corrected significand.

24. The decimal floating-point adder circuit of claim 23, wherein the flag generation circuit identifies one or more digits within the resultant significand at which carry-outs occur, and generates the flag bits to include a string of ones and a string of zeros, wherein each of the ones corresponds to a respective one of the identified bits at which carry is propagated.

25. The decimal floating-point adder circuit of claim 24, wherein the correction circuit adjusts the digits of the resultant significand for which carry-outs occur with a corrective value when an effective operation performed by the adder circuit is arithmetic addition.

26. The decimal floating-point adder circuit of claim 24, wherein the correction circuit adjusts the digits of the resultant significand based on the carry-outs and the flag bits when an effective operation performed by the adder circuit is arithmetic subtraction.

27. The decimal floating-point adder circuit of claim 26, wherein the correction circuit inverts each digit of the resultant significand when a carry-out of the most significant digit is zero, and subtracts a corrective value of six from each digit of the result that has digit carry-out of one.

28. The decimal floating-point adder circuit of claim 26, wherein the correction circuit inverts bits of the result that are flagged by the flag bits when a carry-out of a most significant digit of the resultant significand is non-zero, performs an exclusive OR (XOR) operation on each carry-out for the digits of the resultant significand and the corresponding flag bit, and subtracts a corrective value of six from each digit of the resultant significand where the result of the XOR operation is a zero.

29. A method comprising:
adding, with an adder circuit of a processing circuit, a first significand associated with a first decimal floating-point number and a second significand associated with a second decimal floating-point number to produce a resultant significand, wherein the first and second significands have a number of bits to store a plurality of decimal digits and the resultant significand has a number of bits to store the decimal digits plus a guard buffer to store an additional decimal digit and an additional bit to store a most significant carry-out;
shifting the resultant significand toward a least significant digit when either of the carry-out or the guard buffer contains a non-zero value; and
outputting, with the processing circuit, a resultant decimal floating-point number based on the shifted resultant significand.

30. The method of claim 29, wherein shifting the resultant significand comprises:
shifting the resultant significand of the addition two digits toward the least significant digit when the carry-out buffer contains a non-zero value; and
shifting the result of the addition one digit toward the least significant digit when the carry out buffer contains a zero and the guard buffer contains a non-zero value.

31. The method of claim 29, further comprising incrementing an exponent associated with the resultant significand in parallel with the shift.

32. The method of claim 29, further comprising:
identifying a rounding mode based on a rounding mode identifier; and rounding the resultant decimal floating-point number in accordance with the identified rounding mode.

33. The method of claim 29, wherein the resultant significand has an additional number of least significant bits to store a round digit and a sticky bit, and wherein rounding the resultant decimal floating-point number comprises:
truncating the round digit and the sticky bit from the resultant significand; and
determining whether to increment the truncated resultant significand based on the truncated round digit and the sticky bit.

34. The method of claim 33, further comprising incrementing the truncated result by one when the round digit and the sticky bit satisfy an increment condition of the rounding mode.

35. The method of claim 32, further comprising:
- determining whether rounding of the result produced a carry-out; and
- shifting the rounded resultant decimal floating-point number by one digit toward the least significant digit when the rounding produced the carry-out.

36. A processing circuit comprising:
- a binary adder circuit that adds a first significand associated with a first floating-point number and a second significand associated with a second floating-point number to produce a resultant significand, wherein the first and second significands have a number of bits to store a plurality of decimal digits and the resultant significand has a number of bits to store the decimal digits plus a guard buffer to store an additional decimal digit and an additional bit to store a most significant carry-out; and
- a shift circuit that shifts the resultant significand toward a least significant digit when either the carry-out or the guard buffer contains a non-zero value.

37. The processing circuit of claim 36, further comprising an output conversion circuit to output a resultant decimal floating-point number based on the shifted resultant significand, resultant exponent, and resultant sign.

38. The processing circuit of claim 36, wherein the shift circuit shifts the resultant significand of the addition two digits toward the least significant digit when the carry-out buffer contains a non-zero value, and shifts the result of the addition one digit toward the least significant digit when the carry out buffer contains a zero and the guard buffer contains a non-zero value.

39. The processing circuit of claim 36, wherein the shift circuit increments an exponent associated with the resultant significand in parallel with the shift.

40. The processing circuit of claim 36, further comprising a round circuit identifies a rounding mode based on a rounding mode input and rounds the resultant significand in accordance with the identified rounding mode.

41. The processing circuit of claim 40, wherein the resultant significand has an additional number of least significant bits to store a round digit and a sticky bit, and wherein the round unit truncates the round digit and the sticky bit from the resultant significand and determines whether to increment the truncated resultant significand based on the truncated round digit and the sticky bit.

42. The processing circuit of claim 41, wherein the rounding circuit increments the truncated result by one when the round digit and the sticky bit satisfy an increment condition of the rounding mode.

43. The processing circuit of claim 40, wherein the shifting circuit determines whether the rounding produced a carry-out and shifts the rounded resultant significand by one digit toward the least significant digit when the rounding produced a carry-out.

44. A method comprising:
- receiving, with an adder circuit of a processing circuit, a first decimal floating-point number and a second decimal floating-point number with a decimal floating-point adder;
- aligning, with an alignment circuit of the processing circuit, a first significand associated with the first floating-point number and a second significand associated with the second floating-point number such that a first exponent associated with first floating-point number and a second exponent associated with the second floating-point number are equal;
- adding, with the adder circuit, the aligned first and second significands using a binary adder to produce a resultant significand;
- correcting, with the processing circuit, the resultant significand of the binary addition of the first and second significand using identified locations of carry-outs and generated flag bits;
- rounding, with the processing circuit, the resultant significand in accordance with a specified rounding mode; and
- outputting, with the processing circuit, a resultant decimal float-point number based on the resultant significand and the equal exponent for the aligned first and second significands.

* * * * *